June 3, 1969  R. WEINER ET AL  3,447,934
DEHYDRATED POTATOES HAVING IMPROVED WHIPPING PROPERTIES
Filed Jan. 24, 1966

INVENTORS
RUBIN WEINER,
GERALD R. HEGARTY
BY
Ronald E. Lund
ATTORNEY

United States Patent Office 3,447,934
Patented June 3, 1969

3,447,934
DEHYDRATED POTATOES HAVING IMPROVED WHIPPING PROPERTIES
Rubin Weiner, St. Louis Park, Minn., and Gerald R. Hegarty, Melrose Park, Ill., assignors to The Pillsbury Company, Minneapolis, Minn., a corporation of Delaware
Filed Jan. 24, 1966, Ser. No. 522,551
Int. Cl. A23l 1/12
U.S. Cl. 99—207                        13 Claims

ABSTRACT OF THE DISCLOSURE

Dried potato solids simulating freshly mashed potatoes and possessing improved color, texture and tolerance to adverse whipping conditions are provided by uniformly incorporating into the dry potato solids an edible monoglyceride of a fatty acid and an edible lactylate fatty acid ester salt.

---

Figure 1:
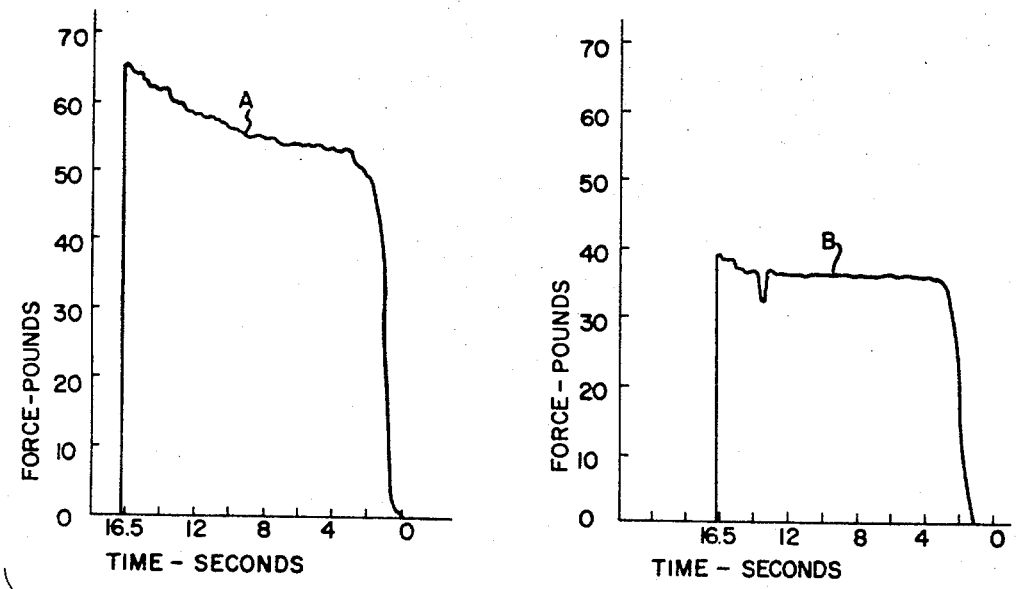

This invention relates to vegetable products containing surface active agents; more particularly, the invention relates to potato products adapted to provide a potato product similar to mashed potatoes when the product is rehydrated with an aqueous medium and whipped.

Heretofore, it has been the practice of the art to prepare dehydrated potatoes, such as potato flakes, by adding distilled monoglycerides such as glycerol monoplamitate and monostearate. Unfortunately, these products upon rehydration and whipping thereof fail to provide sufficiently similar properties to that of freshly mashed potatoes to meet consumer acceptance as a substitute therefor. Included among the dissimilar properties of rehydrated and whipped potato flakes are a heavier and more dense product which lacks the consistency and texture of freshly mashed potatoes. Such rehydrated and whipped potato products have a concomitant objectionable pasty texture. An adverse accompanying yellow color of rehydrated and whipped potato products containing monoglycerides per se is another property that the ultimate consumer finds objectionable. The dried potato products containing monoglycerides per se also provide little tolerance to whipping when used by the ultimate consumer. Such products very readily develop a pasty texture, especially when subjected to prolonged whipping.

It is an object of the present invention to provide a dehydrated potato product which upon rehydration with an aqueous liquid and whipping thereof provides improved eating and taste characteristics.

Another object of the invention is to provide dehydrated potato products capable of providing improved texture when said potato products are rehydrated and whipped by the ultimate consumer.

An additional object of the invention is to provide a rehydratable and whippable dehydrated potato product which has a greater tolerance to whipping when ultimately used by the consumer without developing a concomitant pasty texture.

A still further object is to provide a potato composition having improved processing characteristics.

A fuller understanding of the invention may be had by referring to the description and claims in conjunction with the accompanying drawings wherein: FIGURES I and II are comparative flow characteristics curves depicting reconstituted and whipped dehydrated potato products prepared in accordance with the invention to those of the prior art.

According to the present invention, the foregoing objects are obtained by providing an edible potato product comprising: (a) potato solids, (b) about .05 to about 2.0 weight percent based on the dry potato solid weight of an edible monoglyceride of a fatty acid, and (c) about .05 to about 2.0 weight percent based on the dry potato solid weight of an edible lactylic acid ester salt having the formula:

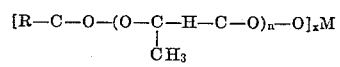

$$[R-C-O-(O-C-H-C-O)_n-O]_xM$$
$$\phantom{[R-C-O-(O-C}\ |\phantom{H-C-O)_n-O]_xM}$$
$$\phantom{[R-C-O-(O-}CH_3$$

wherein M is a metal cation, RCO is the acyl moiety of a fatty acid or mixture of fatty acids having from 12 to 22 carbon atoms, $n$ represents the average degree of polymerization of the lactyl group, the value of $n$ being greater than 1 but less than 4 and $x$ is an integer having a value equal to the valence of the cation.

Typical metal cations are metallic cations of Groups I-A and II-A of the periodic chart of elements disclosed on pages 392 and 393 of the Handbook of Chemistry & Physics, 37th ed., such as sodium, potassium, magnesium, calcium and aluminum. Preferably, M is a number selected from the group consisting of alkali metals and alkaline earth metals having an atomic weight greater than 20 but less than 41. Preferably, $n$ is an integer of 2. The lactylic acid esters (i.e., lactylate) employed herein and the method of preparing the same are disclosed in U.S. Patent 2,789,992.

Advantages resulting from employment of the combination of edible lactylic acid ester salts and monoglycerides of fatty acids include greater tolerance to whipping and improved appearance and texture in the ultimate whipped product. Reconstituted and whipped potato products containing the combination of surface active agents are stiff but yet fluffy in character without accompanying pastiness and heaviness. Processing of dehydrated potato products is enhanced by the combination (e.g., less tendency of the product to stick to the drum drier).

Suitable edible monoglycerides of fatty acids include the saturated and unsaturated fatty acid monoesters of glycerol having monoester groups from 12 to 22 carbon atoms. Illustrative glycerol fatty monoesters are glyceryl monostearate, glyceryl monopalmitate, glyceryl monolaurate, glyceryl monoeleostearate, glyceryl monomyristate, glyceryl mono-oleate, glyceryl monopalmitoleate, glyceryl monoarchidate, glyceryl monobehenate, mixtures thereof and the like. Advantageously employed are the glyceryl fatty acid monoesters wherein the fatty acid group contains from 16 to 18 carbon atoms with the preferred glyceryl monoesters being glyceryl monostearate and glyceryl monopalmitate. In general, the amount of glyceryl monoester to be included with the lactylic acid derivative based upon the potato dry solid weight (i.e., totally dehydrated potato solid weight) ranges from about 0.05 to about 2.0 weight percent. Advantageously, the amount of glyceryl monoester ranges from about 0.2 weight percent to about 0.9 weight percent with an amount ranging from about 0.3 to about 0.6 weight percent being preferred.

Exemplary edible metal salts of lactylic acid esters of fatty acids include calcium stearyl-2-lactylate, sodium stearyl-2-lactylate, potassium stearyl-2-lactylate, magnesium stearyl-2-lactylate, calcium monolauryl-2-lactylate, calcium monopalmityl-2-lactylate, calcium monobehenyl-2-actylate, calcium monomyristyl-2-lactylate, magnesium stearyl-2-lactylate, almuinum stearyl-2-lactylate, potassium stearyl (3) polylactylate, calcium stearyl (3) polylactylate, mixtures thereof and the like. Superior results are achieved by the addition of calcium stearyl-2-lactylate, especially in combination with glyceryl monostearate. In general, the amount of lactylic acid ester salt ranges from about 0.05 to about 2.0 weight percent of the dry potato solid weight. Advantageously, the amount of the lactylic acid ester salt ranges from about 0.1 to about 1.5 weight percent and most preferably from about 0.3 to about 0.9 weight percent of the dry potato solid weight.

The potato products disclosed herein are adaptable to a wide range of dehydrated potato products and may be prepared by various methods. For example, dried potato flakes containing the lactylic acid ester salts may be prepared by the methods disclosed in the James Cording, Jr. et al. U.S. Patents, 2,759,832, 2,787,553 and 2,780,552. Additional dehydrated potato products in which the invention is applicable include the porous dehydrated potato products and the method of preparing the same such as disclosed in U.S. Patents, 3,031,312, 3,031,313 and 3,093,488. In general, such dehydrated potatoes contain less than 10 weight percent moisture (generally ranges between 3 and 10 weight percent) with most conventional methods providing a dehydrated potato product having from about 4 to about 8 weight percent moisture (weight percents based upon the total weight of the dehydrated potato product).

Addition of the edible monoglyceride of a fatty acid and the lactylic acid ester salt may be accomplished by adding the lactylates and monoglycerides separately or together as well as an aqueous solution thereof. Any manner of addition which insures substantial uniform distribution in the dehydrated potato product can be employed. For example, the lactylate ester salt and monoglyceride may be added to the potato product prior to the mashing thereof, after mashing by mastication of the product prior to the drying thereof and the like.

Various other additives conventionally added to dehydrated potato products such as flavoring agents, preservatives, whitening agents, antioxidants, salt, milk solids and additional emulsifiers are adaptable herein.

Illustrative varieties of potatoes adaptable herein include California Russet Burbank, Idaho Russet, Pontiacs, Cobblers, Kennebecs, Snowflakes and other potatoes conventionally used in preparing dried potato products.

In another aspect of the invention, there is provided a potato product containing the lactylic acid ester salts with or without the glyceryl monoester in the amounts hereinbefore mentioned. The lactylic acid ester salts provide greater processing ease (e.g., less tendency of the potato product to stick to the drum drier). Moreover, the lactylic acid ester salts enhence the bulk handling characteristics of the dehydrated potato product.

Unless otherwise disclosed, the moisture and dry potato solid weights are based upon the total weight of the dry potato products including all the components therein and the weight of the surface active agents is based upon the amount of dry potato solids.

EXAMPLE I

Field run potatoes (Kennebecs and Pontiacs) were lye peeled in a conventional manner, sliced into ⅜-inch thick slices and rinsed to remove free starch. Employing conventional potato cooking equipment, the potatoes were cooked at a temperature of 170° F. for about 30 minutes and then steam cooked for an additional 30 minutes. The potatoes were then transferred to a conventional potato ricer and mashed. An aqueous solution of calcium stearyl-2-lactylate (0.46 gram/100 ml. of water) and glyceryl monostearate (0.46 gram/100 ml. of water) was metered onto the mash such that the resultant dehydrated product contained 0.43 weight percent glyceryl monostearate and 0.43 weight percent calcium stearyl-2-lactylate (weight percents based on the dry potato solid weight). The mashed potatoes were then conducted to a hollow drum drier via a screw conveyor (20 feet in length with a 12-inch diameter). The conducted potato product had a 20 percent by weight solids content. Dehydration of the potatoes was accomplished by a typical commercial hollow single drum drier roller with a diameter of about 5 feet and a length of 16 feet which was provided with a doctor blade and 4 feet rollers positioned parallel to the axis of hollow drier roller at a clearance of 0.50 inch. The hollow drier roller surface temperature was maintained at 330° F. with a 5 to 8 second contact time. The resultant dried product had a thickness of 0.009 inch and a moisture content of 6 weight percent. Uniform distribution of the lactylate ester salt and glyceryl monostearate was accomplished by means of the screw conveyor and mastication of the mashed product on the drum drier.

Employing identical process conditions, potato flakes containing conventional amounts of glyceryl monostearate were prepared.

The following Table I discloses the weight percent analysis of ingredients contained in the resultant potato flakes.

TABLE I

| Ingredients | Potato flakes containing calcium stearyl-2-lactylate and glyceryl monostearate, percent | Potato flakes having only glyceryl monostearate, percent |
|---|---|---|
| Dehydrated potato solids | 93.2 | 93.6 |
| Moisture | 6 | 6 |
| Glyceryl monostearate | 0.4 | 0.4 |
| Calcium stearyl-2-lactylate | 0.4 | |
| Total | 100 | 100 |

Several portions of the dehydrated potatoes thus prepared were reconstituted and whipped. The potatoes were prepared by placing in a saucepan 1¼ cups of water, ½ teaspoon of salt and 2 tablespoons of butter and heating the same to boiling. After boiling, the heating thereof was discontinued and ⅓ cup of milk was added to the saucepan. Seventy grams of the dehydrated potato product flakes were then added and stirred gently.

The potato flakes after becoming soft and moist (30 seconds after addition) were then whipped according to the following methods:

Test Procedure I.—Whipped lightly with a household fork for 30 strokes.

Test Procedure II.—Whipped 40 seconds with a standard household "Hamilton Beach" mixer at speed 7 (750 r.p.m.).

Test Procedure III.—Whipped lightly with a household fork for 30 strokes and then whipped for an additional 100 seconds with a standard household "Hamilton Beach" mixer at speed 7 (750 r.p.m.).

The reconstituted and whipped products prepared according to Test Procedures I–III were then evaluated by comparative tests. Overall appearance, texture and color was scored on a basis of 9 for a product having the characteristics of freshly mashed potatoes and 1 for a product which was discolored, pasty, heavy, etc. The fork test was based on drawing a standard household fork, the tines thereof being about half (about ⅞-inch) immersed through the whipped product. The effort necessary to draw the fork through the product and observance of the resultant ridges therefrom and the ability of the ridges thus formed to maintain their shape for 3 minutes thereafter was evaluated. Comparative results, which indicate the tolerance of the resultant products to whipping are disclosed in Table II.

TABLE II.—RESULTS OF TOLERANCE TO WHIPPING TESTS

| Test procedure | Potato flakes containing glyceryl monostearate, per se | Potato flakes containing calcium stearyl-2-lactylate and glyceryl monostearate |
|---|---|---|
| Test Procedure I: | | |
| Appearance | 6 | 8. |
| Texture | 6 | 8. |
| Fork test | Very poor | Good. |
| Comments | Quite pasty | Much stiffer and fluffier. Only very slightly pasty. Quite good. |
| Test Procedure II: | | |
| Fork test | Poor | Good. |
| Comments | Thin and pasty | Better texture, less pasty and soupy. |
| Test Procedure III: | | |
| Appearance | 4 | 8. |
| Texture | 4 | 8. |
| Color | 4 | 8. |
| Fork test | Poor | Good. |
| Comments | Moderately soupy and pasty. White plaster-like color. | Good texture and firmness. Natural color. |

Rheological properties of the whipped product prepared according to Test Procedures I and III were obtained by means of an Allo Kramer Shear Press (Model S2HE) including the Allo Kramer Shear Press, recorder, indicator and 2500-pound proving ring dynamometer. A 0.064-inch orifice cell and 140 gram samples of the whipped products were employed. Figures I and II represent the flow characteristics in pounds force necessary to force the whipped products through the 0.064-inch orifice and were obtained from the electronic recorder set at 10% of full scale value.

In FIGURE 1, the whipped potato products were prepared according to the aforementioned Test Procedure I. Curve $a$ therein represents the aforementioned whipped potato product containing 0.43 weight percent glyceryl monostearate. Curve $b$ represents the aforementioned whipped potato product containing 0.43 weight percent glyceryl monostearate and 0.43 weight percent calcium stearyl-2-lactylate. The curves illustrated in Figure I were conducted at 152° F. and an extrusion time interval of 16.5 seconds.

Figure 2:
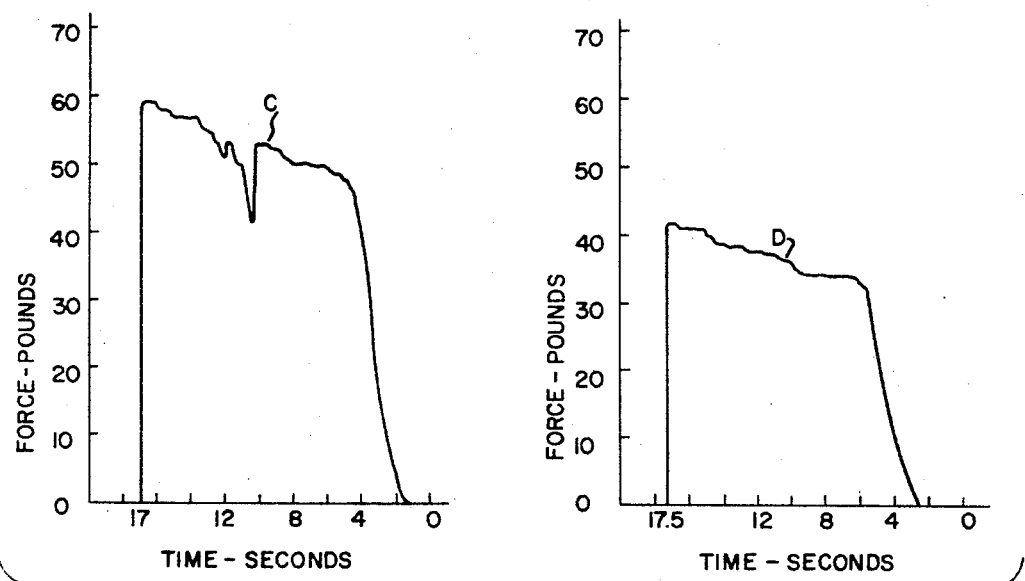

FIGURE 2 is indicative of whipped potato products prepared according to Test Procedure III. Curve $c$ represents the recording obtained from the whipped product containing 0.43 weight percent glyceryl monostearate and curve $d$ represents the product which contained 0.43 weight percent glyceryl monostearate and 0.43 weight percent calcium stearyl-2-lactylate. In FIGURE 2 the temperature was maintained at about 121° F. with an extrusion time interval of about 17.25 seconds.

Whipped potato products which are pasty and heavy require a greater force to extrude the product through the orifice. Accordingly, curves $a$ and $c$ depict higher peaks thus indicating that greater force in pounds was necessary to extrude the product through the orifice than the whipped products of the instant invention (i.e., curves $b$ and $d$).

EXAMPLE II

Employing the process according to Example I with the exception that calcium stearyl-2-lactylate per se is employed in an amount sufficient to provide a dehydrated potato flake containing 0.43 weight percent calcium stearyl-2-lactylate, were prepared. It was observed that greater processing ease was obtained, especially during the dehydrating step. As a result, the rate at which potato flakes could be prepared was increased. The resulting product had enhanced bulk handling characteristics over those containing glyceryl monostearate per se.

What is claimed is:

1. An edible dehydrated potato product adapted to provide a whipped potato product upon reconstitution and whipping, said dehydrated potato product comprising an intimate admixture of:
   (a) potato solids,
   (b) about 0.05 to about 2.0 weight percent based upon the dry solid weight of at least one edible salt of a fatty acid lactylate composition of the general formula:

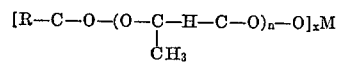

wherein R—C—O is an acyl group of a fatty acid containing from 12 to 22 carbon atoms, M is a metal cation, $x$ is an integer having a value equal to the valence of the metal cation and $n$ is the average number of lactylic groups present in the lactylate, the value of $n$ being greater than 1 but less than 4; and,
   (c) about 0.05 to about 2.0 weight percent based upon the dry potato solid weight of at least one glyceryl monoester wherein the fatty acid group contains from 12 to 22 carbon atoms.

2. The product according to claim 1 wherein the glyceryl monoester has a monoester group from 16 to 18 carbon atoms inclusive with said potato solids containing said edible salt of a fatty lactylate composition and said glyceryl monoester.

3. The dehydrated potato product according to claim 1 wherein the product consists essentially of dry potato solids, moisture, at least one edible lactylate composition and at least one glyceryl monoester, said potato solids comprises at least 90 weight percent of the total weight of the potato product and the moisture contained therein based upon the total weight of the dehydrated product ranges from about 3 to about 8 weight percent.

4. The product according to claim 2 wherein the lactylate is a metal salt of a number selected from the group consisting of alkali metal cations and alkaline earth metal cations, said cations having a molecular weight greater than 20 but less than 41 and $n$ has a value of 2.

5. The product according to claim 4 wherein the acyl group of the edible lactylate composition contains from 16 to 18 carbon atoms inclusive and at least 90 weight percent of the potato product is potato solids.

6. The product according to claim 5 wherein the amount of edible lactylate composition based on the weight of dry potato solids ranges from about 0.1 to about 1.5 weight percent.

7. The product according to claim 5 wherein the edible lactylate composition is calcium stearyl-2-lactylate.

8. The product according to claim 7 wherein the glyceryl monoester is glyceryl monostearate.

9. The product according to claim 8 wherein the amount of calcium-2-stearyl lactylate ranges from about 0.3 to about 0.9 weight percent and the amount of glyceryl monostearate ranges from about 0.3 to about 0.6 weight percent.

10. The dehydrated product according to claim 3 wherein the amount of glyceryl monoester contained therein based upon the total potato solid weight ranges from about 0.2 to about 0.9 weight percent and the amount of edible lactylate composition ranges from about 0.3 to about 0.9 weight percent of the total potato solid weight.

11. The dehydrated product according to claim 10 wherein the acyl group of the lactylate composition contains from 16 to 18 carbon atoms inclusive and the monoester group of the glyceryl monoester contains 16 to 18 carbons atoms inclusive.

12. The dehydrated product according to claim 11 wherein the lactylate composition is calcium stearyl-2-lactylate and the glyceryl monoester is glyceryl monostearate.

13. The product according to claim 12 wherein the amount of calcium stearyl-2-lactylate is about 0.4 weight percent of the potato solid weight and the amount of glyceryl monostearate is about 0.4 weight percent of the potato solid weight.

References Cited
UNITED STATES PATENTS

| | | |
|---|---|---|
| 2,789,992 | 4/1957 | Thompson et al ____ 99—91 X |
| 3,093,488 | 6/1963 | Graham et al. ____ 99—204 X |
| 3,163,546 | 12/1964 | Pader _____ 99—207 |
| 3,275,458 | 9/1966 | Willard _____ 99—207 |
| 3,346,387 | 10/1967 | Moncrieff et al. __ 99—204 X |

A. LOUIS MONACELL, *Primary Examiner.*

D. M. NAFF, *Assistant Examiner.*

U.S. Cl. X.R.

99—100